(12) United States Patent
Maeta et al.

(10) Patent No.: US 7,500,810 B2
(45) Date of Patent: Mar. 10, 2009

(54) INSERT WITH REPLACEABLE CUTTING EDGE AND CORNER MILLING CUTTER WITH REPLACEABLE CUTTING EDGE

(75) Inventors: Atsuhiko Maeta, Itami (JP); Shigenori Emoto, Itami (JP)

(73) Assignee: Sumitomo Electric Hardmetal, Corp., Hyogo (JP)

( * ) Notice: Subject to any disclaimer, the term of this patent is extended or adjusted under 35 U.S.C. 154(b) by 0 days.

(21) Appl. No.: 11/557,157

(22) Filed: Nov. 7, 2006

(65) Prior Publication Data
US 2007/0104546 A1 May 10, 2007

(30) Foreign Application Priority Data
Nov. 7, 2005 (JP) ............... 2005-322115

(51) Int. Cl.
*B23B 27/16* (2006.01)
*B23B 27/00* (2006.01)

(52) U.S. Cl. ................. 407/113; 407/114; 407/115; 407/116

(58) Field of Classification Search ......... 407/113–116, 407/119, 40, 67, 66
See application file for complete search history.

(56) References Cited

U.S. PATENT DOCUMENTS

| | | | | |
|---|---|---|---|---|
| 3,490,117 | A | * | 1/1970 | Hertel .................. 407/104 |
| 4,074,949 | A | * | 2/1978 | Hochmuth et al. .......... 407/114 |
| 6,921,233 | B2 | * | 7/2005 | Duerr et al. ............... 407/34 |
| 7,063,489 | B2 | * | 6/2006 | Satran .................. 407/113 |
| 7,104,736 | B2 | * | 9/2006 | Satran et al. ............. 407/113 |

FOREIGN PATENT DOCUMENTS

| | | |
|---|---|---|
| CN | 1655901 A | 8/2005 |
| CN | 200610138072.8 | 3/2008 |
| JP | 2003-266232 A | 9/2003 |
| JP | 2004-284010 A | 10/2004 |
| JP | 2004-291205 A | 10/2004 |
| WO | 03/101655 A1 | 12/2003 |
| WO | WO-2005/075135 A1 | 8/2005 |

* cited by examiner

*Primary Examiner*—Willmon Fridie
(74) *Attorney, Agent, or Firm*—Ditthavong Mori & Steiner, P.C.

(57) ABSTRACT

A replaceable-blade cutting insert for corner milling cutters has a first and second surface; a third and fourth surface connected to a first side edge and a second side edge thereof respectively; and a fifth and sixth surface connected to a first edge and a second edge of the first surface and the second surface respectively. The first surface is used as rake face, the third surface is used as an outer perimeter flank face, and the fifth surface is used as a forward flank face. A twisted surface is disposed on a section of the third surface, forming a ridge line that acts as a main cutting edge intersecting with the first surface and interposed between the third and first surface. The first and second surface can be positioned with a height offset relative to each other so that at least one set of diagonal corners are projected.

9 Claims, 10 Drawing Sheets

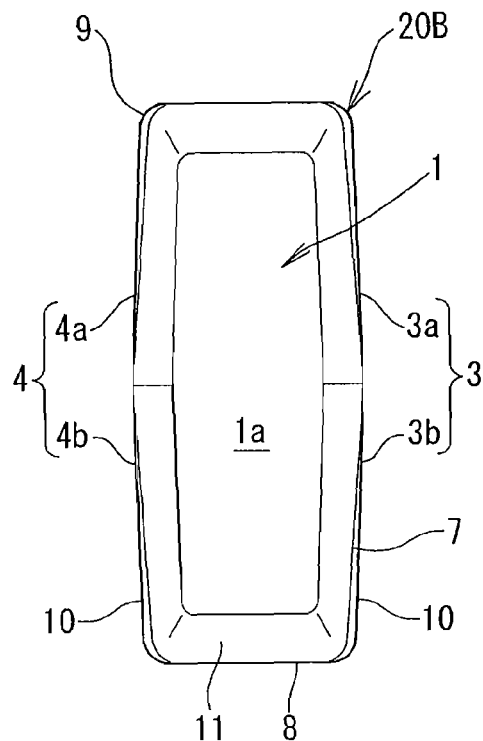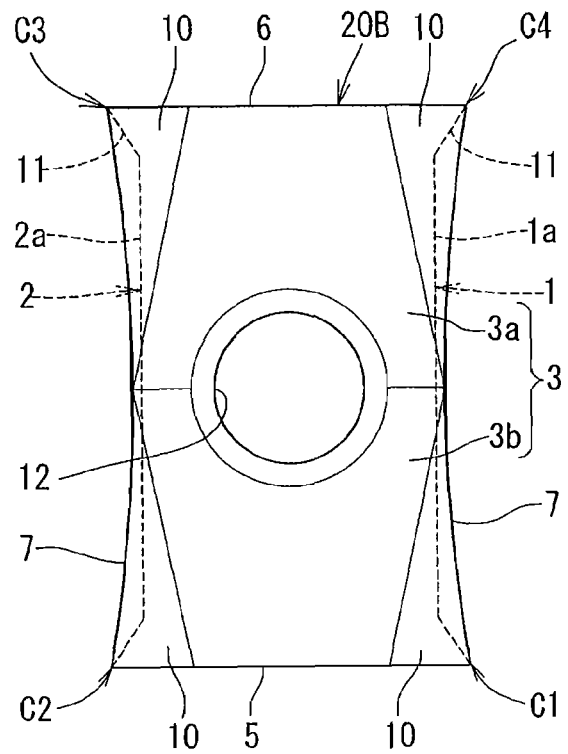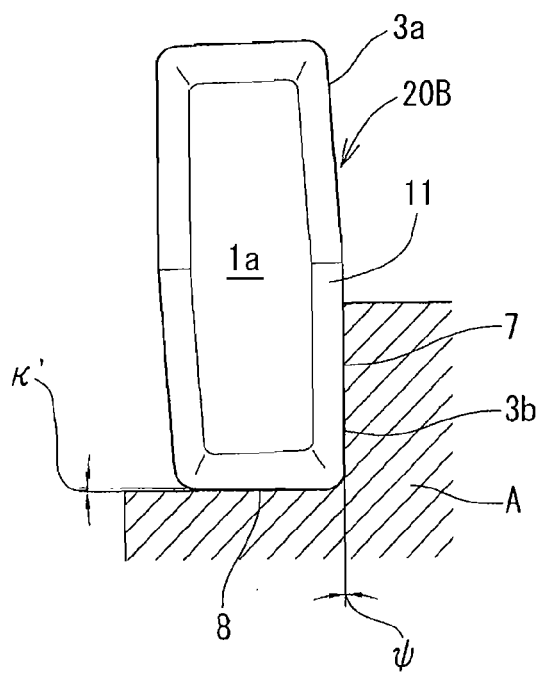

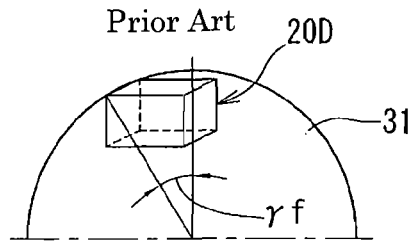
FIG. 11A Prior Art
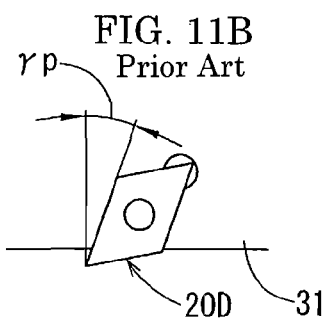
FIG. 11B Prior Art
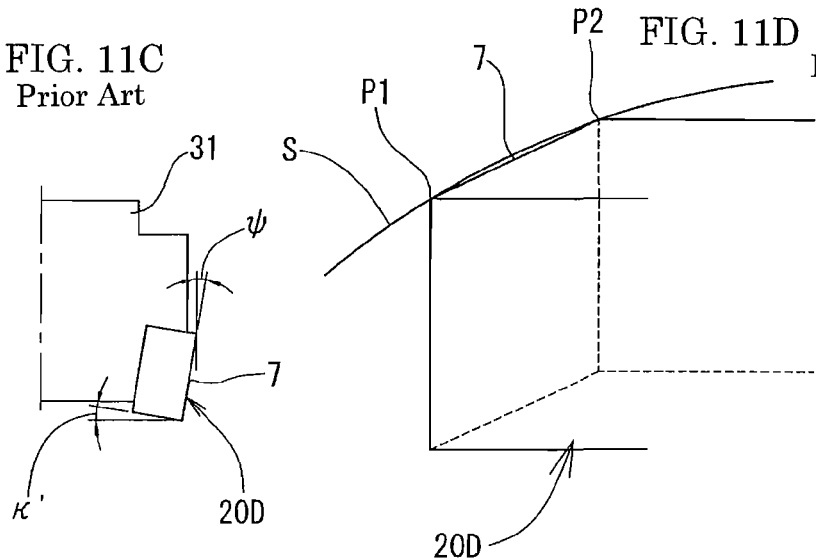
FIG. 11C Prior Art
FIG. 11D Prior Art
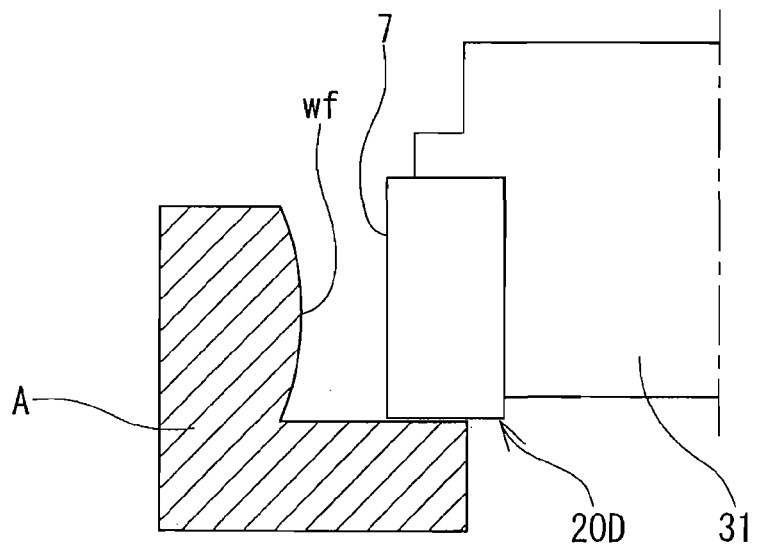
FIG. 12

INSERT WITH REPLACEABLE CUTTING EDGE AND CORNER MILLING CUTTER WITH REPLACEABLE CUTTING EDGE

INCORPORATION BY REFERENCE

The present application claims priority under 35 U.S.C. §119 to Japanese Application No. 2005-322115, filed on Nov. 7, 2005. The content of the application is incorporated herein by reference in its entirety.

BACKGROUND OF THE INVENTION

1. Field of the Invention

The present invention relates to a insert with a replaceable cutting edge. More specifically, the present invention relates to a replaceable-blade cutting insert and corner milling cutter with replaceable cutting edge using the same, in which the squareness of the cut corner and the flatness of the vertical wall of the cut corner are improved. The corner milling cutter of the present invention also includes end mills with replaceable cutting edges.

2. Description of the Background Art

Among widely known corner milling cutters, there are ones in which a cutting section is formed as an insert with a replaceable cutting edge (Japanese Laid-Open Patent Publication Number 2003-266232, Japanese Laid-Open Patent Publication Number 2004-291205, and the like). In the corner milling cutter with replaceable cutting edge described in Japanese Laid-Open Patent Publication Number 2003-266232, a parallelogram negative insert is mounted on a base positioned at an outer perimeter of an end of a main cutter body, with the side surface forming the rake face and the end surface (either the upper or lower surface) forming the outer perimeter flank face. In this type of cutter, the use of a parallelogram or trapezoid insert makes it possible to provide a positive axial rake. Since the flank face is formed at the outer perimeter flank face, the radial rake has to be a negative angle.

A negative radial rake, however, reduces the cutting quality of the cutter. To overcome this, Japanese Laid-Open Patent Publication Number 2004-284010 describes a cutter insert in which the base unit is twisted around two axial lines. In the cutter insert in Japanese Laid-Open Patent Publication Number 2004-284010, a height offset is formed at the ceiling surface or the base surface forming the rake face toward the corner side, thus providing a positive radial rake angle by providing a flank angle on the outer perimeter flank face. A similar cutter insert is also disclosed in WO2005/075135.

Referring to FIGS. 11A-11D, the problems involved with corner milling cutters that use rhombus chips will be described. In the cutter in FIG. 11, a rhombus insert 20D is mounted at the outer perimeter at the end of a main cutter body 31 so that the axial rake γp is positive, the radial rake γf is negative, the face angle (front cutting section angle) κ' is positive, and the approach angle Ψ is positive. When the insert 20D is sloped so that an end point P2 of a ridge line 7 forming the main cutting section passes through the same circle as a path circle S of an end point P1, the sections of the ridge line 7 excluding its ends pass positions outside of the path circle S. As shown in FIG. 11D, the amount by which the ridge line 7 departs from the path circle S is greater toward the center of the ridge line. As shown in FIG. 12, a wall surface wf of a workpiece A cut by the ridge line 7 will form a surface that is expanded toward the middle, thus reducing the squareness of the cut corner.

Japanese Laid-Open Patent Publication Number 2004-291205 describes a technology that allows an insert to be tilted in a direction where the approach angle Ψ is a positive angle. As shown in FIG. 11, by having a positive angle for the approach angle Ψ, the end point P2 of the ridge line 7 can be positioned on the path circle S and the path of the main cutting section can be made to approach a direction that would be parallel with the axial line of the cutter.

This method, however, cannot overcome the problems described above.

Also, Japanese Laid-Open Patent Publication Number 2004-284010 and WO2005/075135 do not appear to make a special effort to improve the flatness of the wall surface of the workpiece or the squareness of the cut corner. The same applies to Japanese Laid-Open Patent Publication Number 2003-266232. As described in Japanese Laid-Open Patent Publication Number 2004-284010 and WO2005/075135, in a cutter with a height offset at the rake face so that the surface position is higher toward the corner and a radial rake that can be set up as a positive angle, inferior flatness of the wall surface of the workpiece and squareness of the cut corner becomes more prominent.

SUMMARY OF THE INVENTION

The object of the present invention is to improve the shape of an insert with replaceable cutting edge in order to improve the squareness of the corner and the flatness of the cut wall surface of a workpiece cut with a corner milling cutter that uses this insert.

In order to achieve this object, the present invention provides a replaceable-blade cutting insert for corner milling cutters including: a first surface and a second surface facing opposite directions; a third surface and a fourth surface intersecting with and connecting to the first surface and the second surface; a fifth surface and a sixth surface intersecting with the first surface and the second surface and the third surface and the fourth surface; wherein the first surface is used as a rake face, the third surface is used as an outer perimeter flank face, and the fifth surface is used as a front flank face. In addition, a twisted surface is formed at a section of the third surface, intersecting with the first surface and creating with the first surface a ridge line serving as a main cutting section. The twisted surface is sloped in a direction that increases an intersection angle with the first surface and is formed with a width W that gradually decreases as a distance from an end of the ridge line increases Preferable aspects of this replaceable-blade cutting insert are as follows. (1) A height offset is formed on the first surface so that a surface position toward a corner is higher. This height offset can be set so that all four corners are raised or only a first pair of diagonal corners can be raised. (2) A positive land is formed on an outer perimeter section of the first surface. (3) A section of the third surface excluding the twisted surface includes two flat surfaces, the two flat surfaces intersecting at an obtuse angle to form a hump when the first surface is viewed from a front view. (4) An angle of a corner where the fifth surface and the third surface intersect is no more than 95 deg. (5) When the insert is rotated 180 deg along a horizontal plane, an outline shape stays identical between the third surface and the fourth surface and between the fifth surface and the sixth surface. (6) When the insert is flipped around a bisecting line (L) bisecting a height axis of the first surface, an outline shape stays identical between the first surface and the second surface.

A replaceable-blade corner milling cutter is completed when one of these replaceable-blade cutting insert is mounted on a base disposed at an outer perimeter of an end of a main cutter body so that the first surface serves as a rake face, the third surface including the twisted surface serves as an outer perimeter flank face, the fifth surface serves as a front flank face, the ridge line between the first surface and the twisted surface serves as a primary cutting section, and a ridge line between the first surface and the fifth surface serves as a secondary cutting section, and so that a axial rake ($\gamma p$) is positive or negative, a radial rake ($\gamma f$) is negative, and an approach angle ($\Psi$) is 0 deg. The present invention also provides this replaceable-blade corner milling cutter.

When the twisted surface described above is formed from a section of the third surface serving as the outer perimeter flank face, the ridge line formed between the first surface serving as the rake face and the twisted surface (the ridge line serving as the main cutting section) is shaped so that it is expanded outward around an intermediate longitudinal position when the first surface is seen directly from the front. Also, the dulling effect of the twisted surface on the cutting edge increases the strength of the cutting edge.

When a height offset is provided for the first surface to raise the surface toward the corner, an outer perimeter flank is formed on the third surface and positive angle radial rake $\gamma f$ is applied to the cutting edge, thus improving the cutting quality of the cutting edge. When a height offset is formed on the first surface so that only one set of diagonal corners are raised, the axial rake $\gamma p$ is also set to be positive, providing further improvements in cutting quality. When all four corners of the first surface are raised, it may not be possible to set the axial rake $\gamma p$ to be positive. But even if the axial rake $\gamma p$ has to be negative, the rake angle is larger compared to a structure with no height offset in the first surface, so the cutting quality is improved. When a positive land is formed on the outer perimeter section of the first surface, the cutting edge can be made sharp and the cutting quality can be improved.

Also, when a section of the third surface excluding the twisted surface forms a hump when the first surface is viewed directly from the front, a positive face angle can be applied with an approach angle at 0 deg.

Furthermore, when the corner at which the fifth surface and the third surface intersect has an angle of no more than 95 deg, it is easy to provide a positive face angle (front cutting section angle).

In addition, with a structure where, when the insert is rotated 180 deg along a horizontal plane, an outline shape stays identical between the third surface and the fourth surface and between the fifth surface and the sixth surface, two diagonal corners or four corners of the first surface can be used as cutting sections. In addition, with a structure where, when the insert is flipped around a bisecting line (L) bisecting a height axis of the first surface, an outline shape stays identical between the first surface and the second surface, two diagonal corners or four corners can be used as cutting sections, thus increasing economic advantages.

BRIEF DESCRIPTION OF THE DRAWINGS

FIGS. 4A-4C are further examples of a replaceable-blade cutting insert according to the present invention. 4A: front-view drawing. 4B: side-view drawing. 4C: simplified drawing showing the main elements of the structure in use.

FIGS. 11A-11D are simplified drawings of a prior art corner milling cutter using a rhombus chip; 11A: front-view drawing. 11B: cross-section drawing. 11C: side-view drawing. 11D: detail drawing of the circled frame in the front-view drawing A.

FIG. 12 is a cross-section drawing exaggerating the corner surfaces cut with the cutter from FIG. 11.

DETAILED DESCRIPTION OF THE INVENTION

Figure 1A:
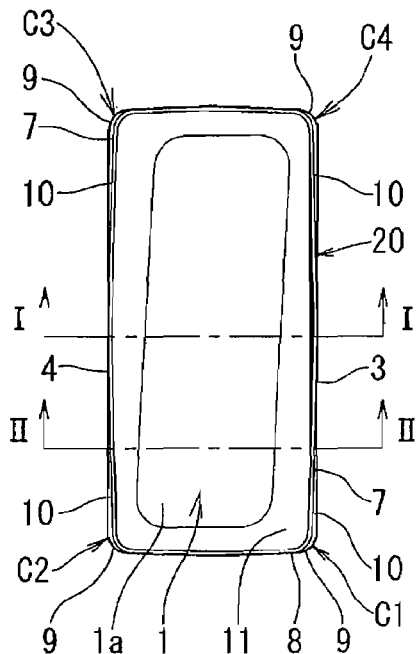
FIGS. 1A-1F are examples of a replaceable-blade cutting insert according to the present invention. 1A: front-view drawing. 1B: side-view drawing. 1C: bottom-view drawing. 1D: a cross-section drawing along the I-I line in FIG. 1A. 1E: A cross-section drawing along the II-II line in FIGS. 1A. 1F: A drawing showing the fifth (sixth) surface formed with a hump.
Figure 1B:
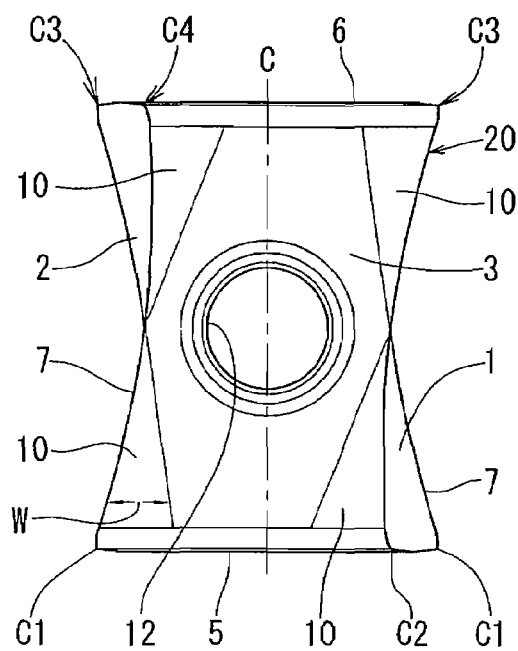
Figure 1C:
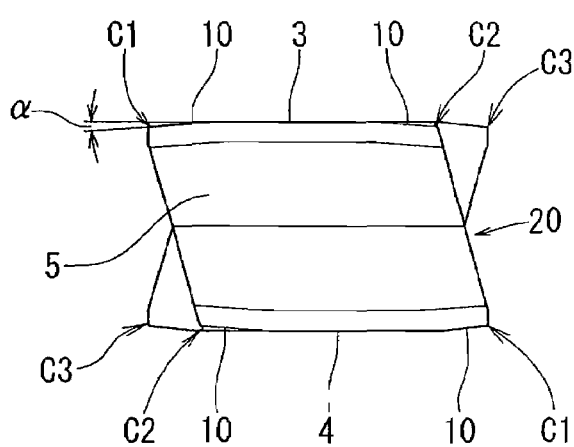
Figure 1D:
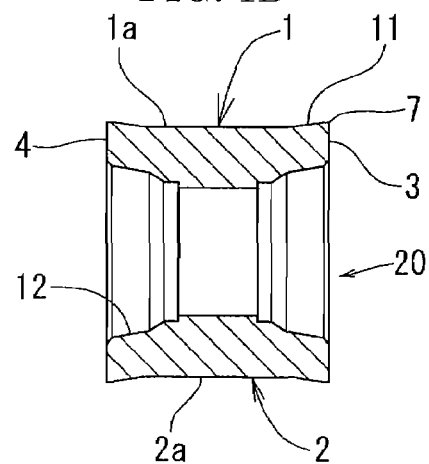

FIG. 1 through FIG. 5 show a specific example of an insert with replaceable cutting edge according to the present invention. In FIG. 1, a replaceable cutting edge insert 20 is formed as an insert with: a long first surface 1 and a second surface 2 facing in opposite directions; a third surface 3 and a fourth surface 4 intersecting with and connected to a first side edge and a second side edge of the first surface 1 and the second surface 2; and a fifth surface 5 and a sixth surface 6 intersecting with and connected to a first end and a second end of the first surface 1 and the second surface 2. The fifth surface 5 and the sixth surface 6 are also connected, by way of corner curve surfaces 9 to a first end and a second end of the third surface 3 and the fourth surface 4

The first surface 1 and the second surface 2 are surfaces formed with the same shape, and these surfaces can be switched to serve as rake faces. Positive lands 11 are formed at the outer perimeters of the first surface 1 and the second surface 2 so that the rake angle of the cutting edge is positive, and the central sections 1a, 2a are formed as lowered surfaces. The surface positions gradually increase going from corners C2, C4 to a corner C1 and likewise going from corners C2, C4 to a corner C3. Of the four corners C1-C4, one set of diagonal corners C1, C3 are formed so that they are positioned at the outermost ends when seen in the figure (see FIG. 1B) that looks directly at the third surface 3 (or the fourth surface 4). The positive land 11 is preferable but not required.

A ridge line 7 is provided at the curve formed where a twisted surface 10 and the first surface 1 intersect and where the twisted surface 10 and the second surface 2 intersect, and this ridge line 7 is used as a main cutting section. A ridge line 8 is a ridge line formed between the first surface 1 and the fifth and sixth surfaces 5, 6 and between the second surface 2 and the fifth and sixth surfaces 5, 6. This is used as a secondary cutting section.

The third surface 3 and the fourth surface 4 are also formed as surfaces with identical shapes, and these are used as outer perimeter flank faces. The fifth surface 5 and the sixth surface 6 are also formed as surfaces with identical shapes, and these are used as front flank faces.

Sections of the third surface 3 and the fourth surface 4, i.e., the sections along the surfaces 1, 2, form the twisted surfaces 10. The twisted surfaces 10 are formed as four surfaces at the third surface 3 and the fourth surface 4. The twisted surfaces 10 are sloped so that the angle of intersection with the positive lands 11 formed on the first and second surfaces 1, 2 increase. Also, the twisted surfaces 10 are formed so that a width W (see FIG. 1B) gradually decreases as the distance from the corners of the third and fourth surfaces 3, 4 increases. It can be preferable for the slope angle a (see FIG. 1E) of the twisted surface 10 relative to the third surface 3 and the fourth surface 4 to be set to approximately 3-15 deg. If a is 3 deg or less, the increased cutting edge strength provided is small. Also, if $\alpha$ is 15 deg or more, flatness for the wall surface of the workpiece becomes difficult to obtain.

Figure 2:
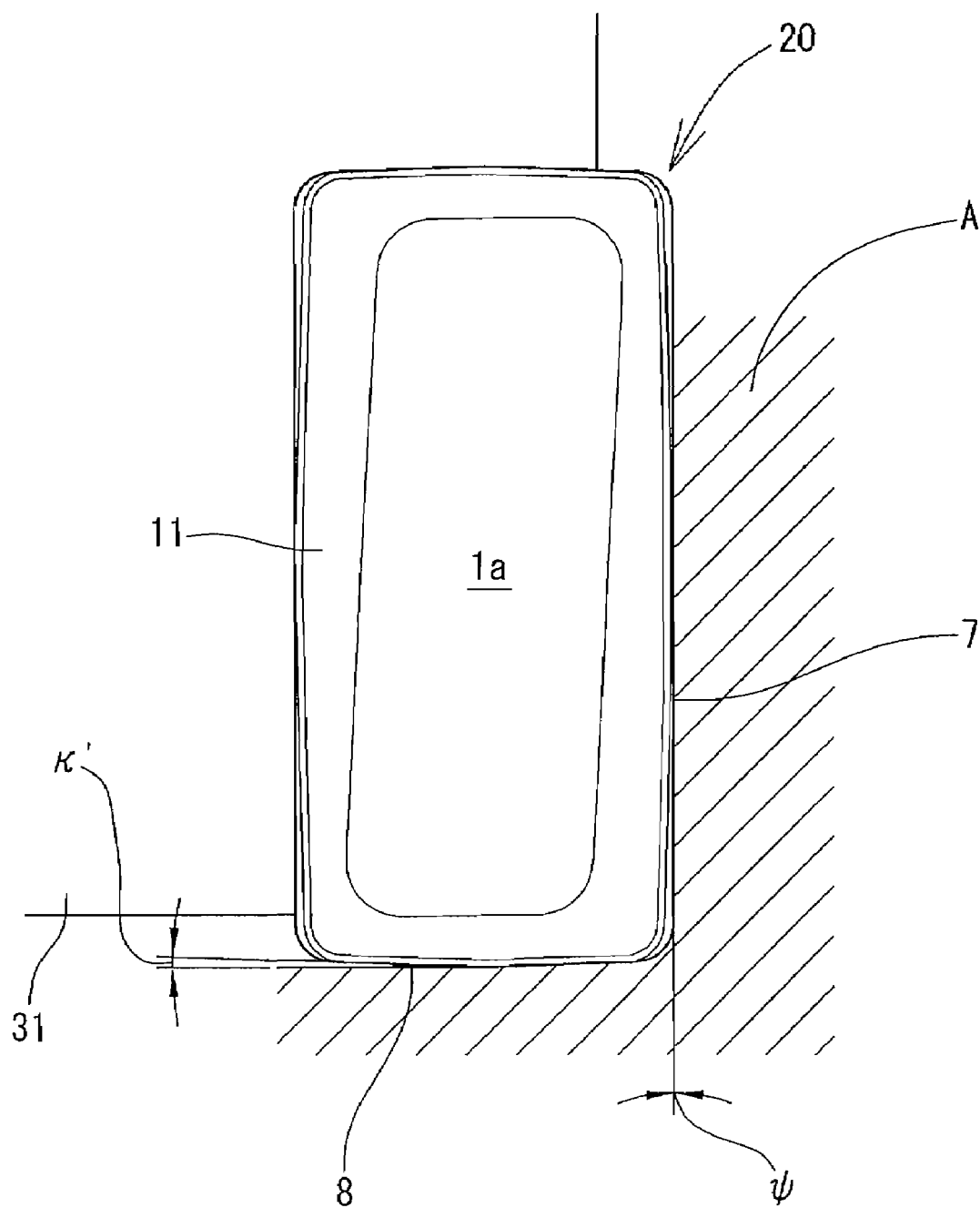
FIG. 2 is a simplified drawing showing the main elements of the insert from FIG. 1 being used.
Figure 3A:
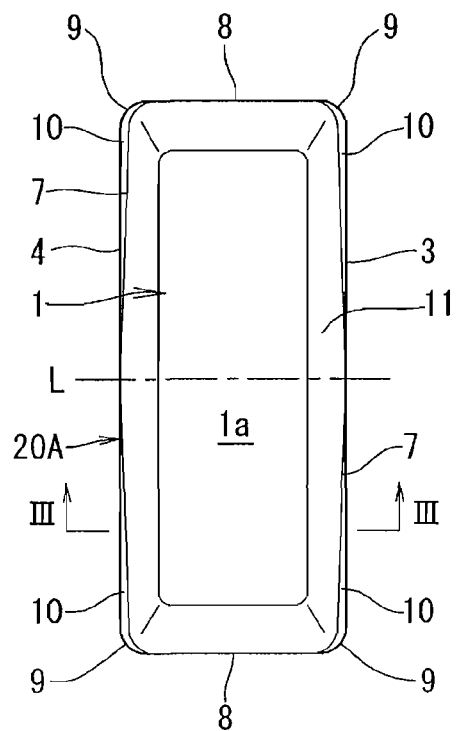
FIGS. 3A-3D are another examples of a replaceable-blade cutting insert according to the present invention. 3A: front-view drawing. 3B: side-view drawing. 3C: a cross-section drawing along the III-III line in FIG. 3A. 3D: A drawing showing the fifth (sixth) surface formed with a hump.
Figure 3B:
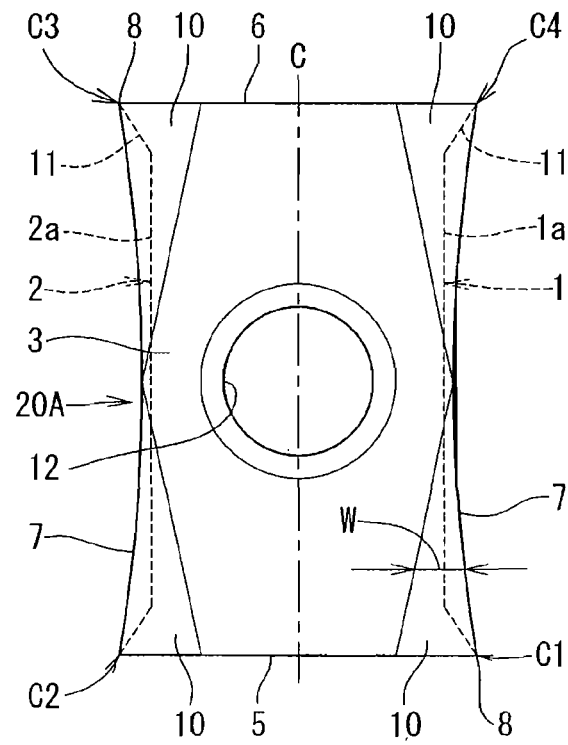
Figure 3C:
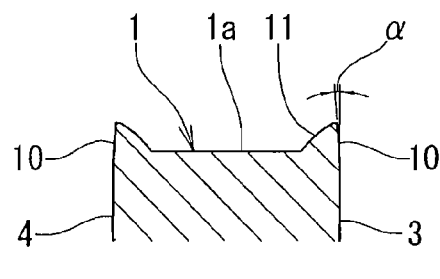
Figure 3D:
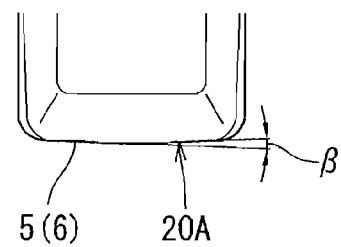

As shown in FIG. 1A, where the first surface 1 is seen directly from the front, the presence of the twisted surfaces 10 results in the ridge line 7 expanding outward around an intermediate longitudinal position. As shown in FIG. 2, with the insert 20 sloped so that the axial rake is positive and the radial rake is negative, the rotation path of the main cutting section formed by the ridge line 7 can form a straight vertical line with an approach angle $\Psi$ that is roughly 0 deg. This improves the squareness of the cut corner surface and improves the flatness of the cut wall surface.

Figure 1E:
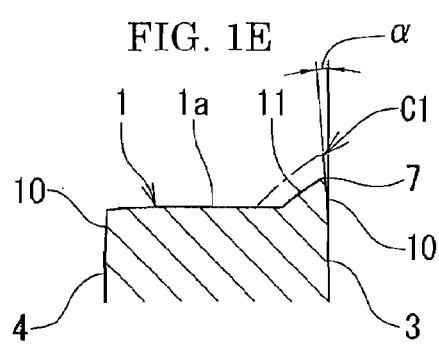

Also, compared to not forming the twisted surface 10, the use of the twisted surface 10 results in a more obtuse intersection angle with the positive land 11 (see FIG. 1E). This improves the strength of the main cutting edge.

In this replaceable cutting edge insert 20 shown in FIG. 1, out of the four corners C1-C4 of the first surface 1 (or the second surface 2), the pair of diagonal corners C1, C3 are used as cutting edges. By forming a large height offset on the first surface 1 and increasing the height of the diagonal corners C1 and C3, when the insert is upright as shown in FIG. 1B, the diagonal corners C1, C3 project significantly in the direction away from a lateral center line C of the third surface (in the direction in which the rake angle increases), and the slope of the ridge line 7 relative to the center line C increases (the same applies to the second surface 2 side). As a result, the axial rake of the cutting section is increased and the quality of cuts is improved. When the insert is upright as shown in FIG. 1B, the axial rake can be increased, e.g., up to approximately +5 deg, making it possible to provide a "high-rake" corner milling cutter.

Figure 1F:
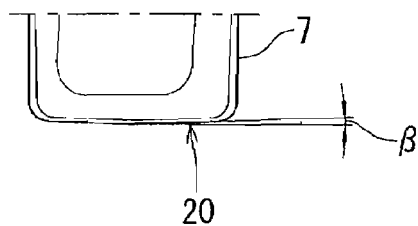

It can be preferable for the fifth surface 5 and the sixth surface 6 to intersect with the third surface 3 and the fourth surface 4 at an angle of no more than 95 deg. As shown in FIG. 1F, when the fifth surface 5 and the sixth surface 6 protrude on both sides by an angle $\beta$ of a few degrees (or the angle can be 1 deg or less), to form a sloped hump surface, a positive face angle $\kappa'$ can be applied to an insert with an approach angle $\Psi$ of 0 deg (FIG. 2).

The sections of the third surface 3 and the fourth surface 4 outside of the twisted surfaces 10 can be formed from multiple flat and curved surfaces. It is also possible to have the ridge line 7 serving as the main cutting section formed as a straight ridge line, and the ridge line 8 serving as the secondary cutting section formed as a curved ridge line. Furthermore, in the replaceable cutting edge insert 20 shown in FIG. 1, the diagonal corners C1, C3 of the surfaces 1, 2 are formed higher than other sections, and the corners C1, C3 are used as cutting edges, with the corners C1, C3 and the corners C2, C4 being formed with different shapes. However, it is also possible to have an insert where all four corners are formed with the same shape.

FIG. 3 shows an insert according to another example. This replaceable cutting edge insert 20A is an insert that is based on rectangular parallelepiped shape. The four corners C1-C4 of the first surface 1 and the second surface 2 are formed with the same shape. Positive lands 11 are formed at the outer perimeters of the first surface 1 and the second surface 2, and the central sections 1a, 2a of the surfaces 1, 2 are indented. The surfaces 1, 2 are highest at the corners C1-C4. The curved ridge line 7 is formed at the intersection between the positive land 11 and the twisted surface 10 formed from sections of the third and fourth surfaces 3, 4.

With this replaceable cutting edge insert 20A according to this example, the diagonal corners C2, C4 of the first surface 1 and the second surface 2 can be used as cutting edges for a cutter rotating clockwise, while the remaining corners C1, C3 can be used as cutting edges for a cutter rotating counterclockwise. However, since all the corners C1-C4 have the same height (amount of projection), the amount of projection (the amount of projection in the direction of increasing rake angle) for the corners cannot be as great as those for the insert in FIG. 1. Thus, the rake angle is smaller than that of the insert in FIG. 1, and a positive axial rake cannot always be guaranteed when installed on the main cutter body. However, this structure will achieve the objects of improving the squareness of the corner and the flatness of the cut wall surface of the workpiece.

Other aspects of the replaceable cutting edge insert 20A in FIG. 3 are the same as those of the insert in FIG. 1, so like numerals are assigned to elements and corresponding descriptions will be omitted.

FIG. 4 shows a replaceable cutting edge insert 20B according to a further example. The sections of the third surface 3 and the fourth surface 4 outside of the twisted surfaces 10 are formed from multiple flat surfaces 3a, 3b and flat surfaces 4a, 4b. The flat surfaces 3a, 3b and the flat surfaces 4a, 4b intersect at obtuse angles and form humped surfaces when the first surface 1 or the second surface 2 is viewed directly from the front. With this type of shape for the third surface 3 and the fourth surface 4, a positive face angle $\kappa'$ can be applied with an approach angle $\Psi$ of 0 deg without having the fifth and sixth surfaces 5, 6 formed as humps. Other aspects of the replaceable cutting edge insert 20B in FIG. 4 are the same as those of the insert in FIG. 1, so overlapping descriptions will be omitted.

Figure 5A:
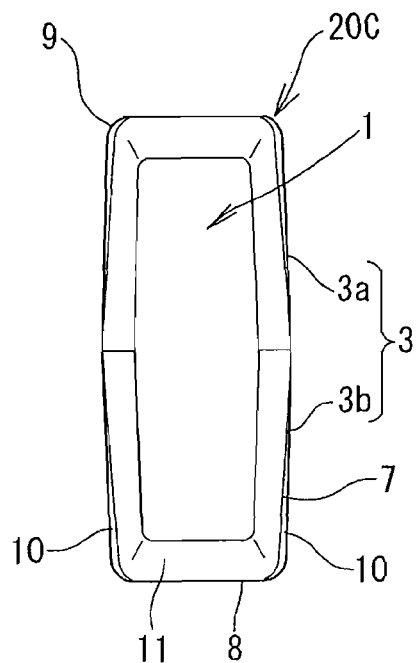
FIGS. 5A-5C are examples of a replaceable-blade cutting insert according to the present invention. 5A: front-view drawing. 5B: side-view drawing. 5C: simplified drawing showing the main elements of the structure in use.
Figure 5B:
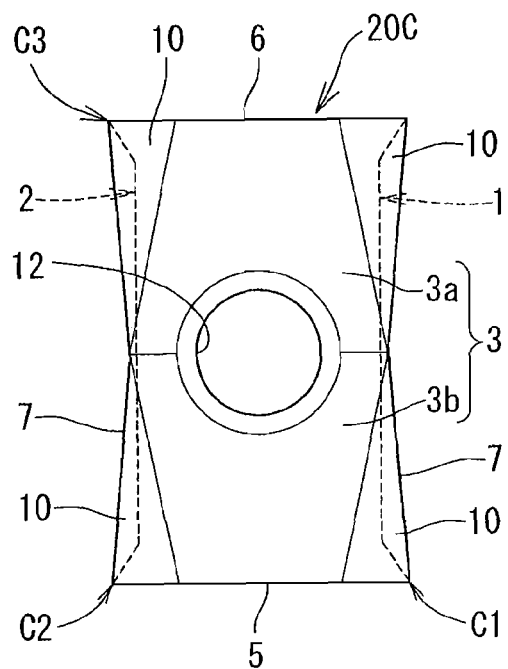
Figure 5C:
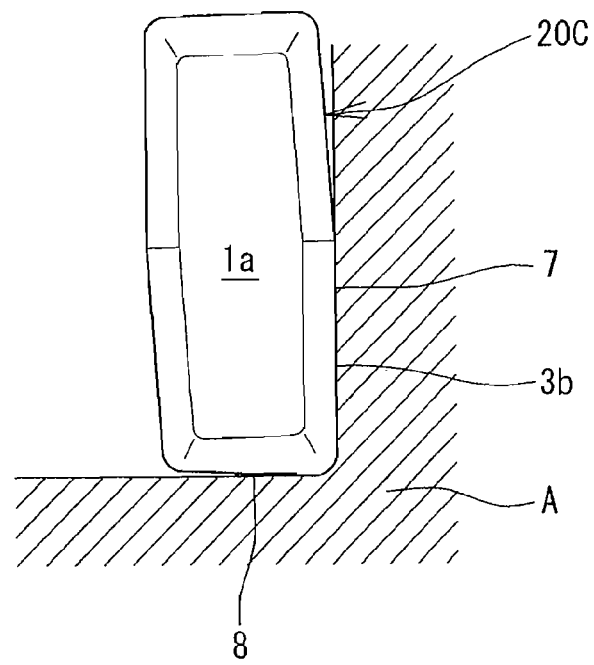

FIG. 5 shows a replaceable cutting edge insert 20C according to a fourth example, in which the ridge line 7 is formed as a linear ridge line that is bent at an intermediate position. A linear ridge line will be somewhat shorter than a curved ridge line, but a main cutting section that is formed as a linear ridge line will provide advantages that are not significantly different from those provided by a structure in which the main cutting section is formed as a curved ridge line. Other aspects of the structure are the same as those of the replaceable cutting edge insert 20b in FIG. 4.

The replaceable cutting edge insert 20 in FIG. 1 and the replaceable cutting edge inserts 20A, 20B, 20C of FIG. 3 through FIG. 5 are all shaped so that the outline shape does not change when turned 180 deg along the horizontal plane. Also, when the insert is inverted around a bisecting line L that bisects along the height axis of the first surface 1 (see FIG. 3A), the outline of the first surface 1 and the second surface 2 do not change after inverting. Thus, the two diagonal corners of the first surface 1 and the two diagonal corners of the second surface 2 can be used as cutting edges by rotating the structure. Also, the inserts 20A, 20B, 20C in FIG. 3 through FIG. 5 can be mounted on a cutter that is rotated in reverse so that the remaining two corners of the first and second surfaces can be used as cutting edges. Thus, while all the inserts can be economically advantageous, it is possible to have different shapes for the first surface 1 and the second surface 2, the third surface 3 and the fourth surface 4, and the fifth surface 5 and the sixth surface 6. Regardless of whether there are many or fewer usable corners, the present invention improves the squareness of cut corners.

FIG. 6 through FIG. 9 show an example of a corner milling cutter that uses an insert with replaceable cutting edge according to the present invention. In this corner milling cutter 30, the replaceable-blade cutting insert 20 from FIG. 1 is mounted on a base 32 provided at the outer perimeter of the end of a main cutter body 31.

In the replaceable cutting edge insert 20, the first surface 1 forms a rake face, the twisted surface 10 and the third surface 3 form an outer perimeter flank face, the fifth surface 5 forms a front flank face, the ridge line 7 between the first surface 1 and the third surface 3 forms the main cutting section, the ridge line 8 between the first surface 1 and the fifth surface 5 forms the secondary cutting section. The insert is oriented so that the axial rake $\gamma p$ is +5 deg, the radial rake $\gamma f$ is −15 deg. The approach angle $\Psi$ is 0 deg and the face angle $\kappa'$ is 15'.

The replaceable cutting edge insert 20 is secured to the main cutter body 31 using a clamp screw 33 passed through an attachment hole 12. The insert of this example is formed with the attachment hole 12 (see FIG. 1 through FIG. 5), which extends from the third surface 3 to the fourth surface 4. The clamp screw 33 (see FIG. 6, FIG. 7) is passed through the attachment hole 12, and the clamp screw 33 is screwed radially into the main cutter body 31 to and is secured to the main cutter body 31 (see FIG. 6 through FIG. 10). However, if space is available, it is also possible for the attachment hole 12 to be extended from the first surface 1 to the second surface 2, with a clamp screw being passed through the attachment hole and being tightened and secured in a direction perpendicular to the cutter radius.

Figure 6:
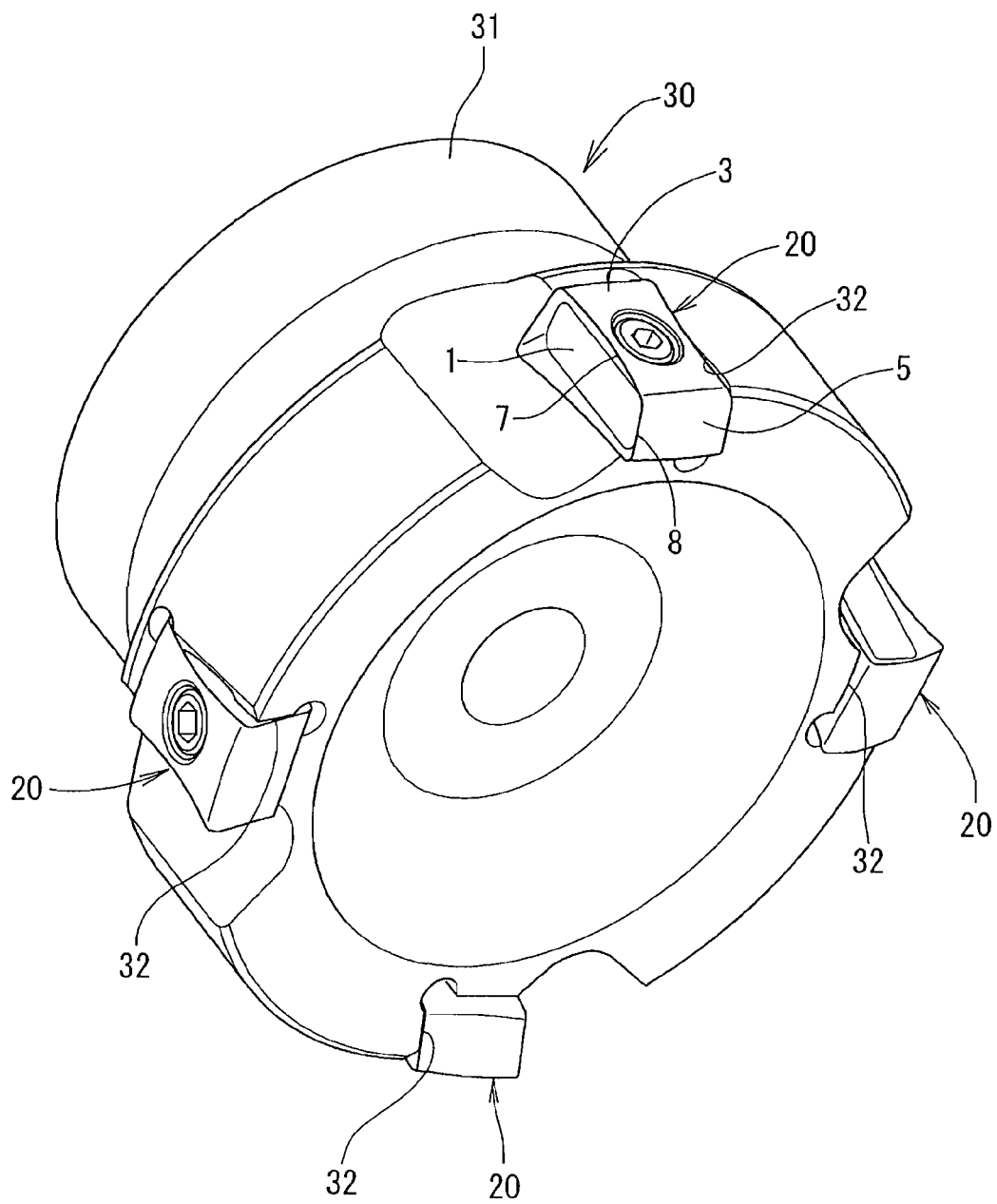
FIG. 6 is a perspective drawing showing an example of a corner milling cutter according to the present invention.
Figure 7:
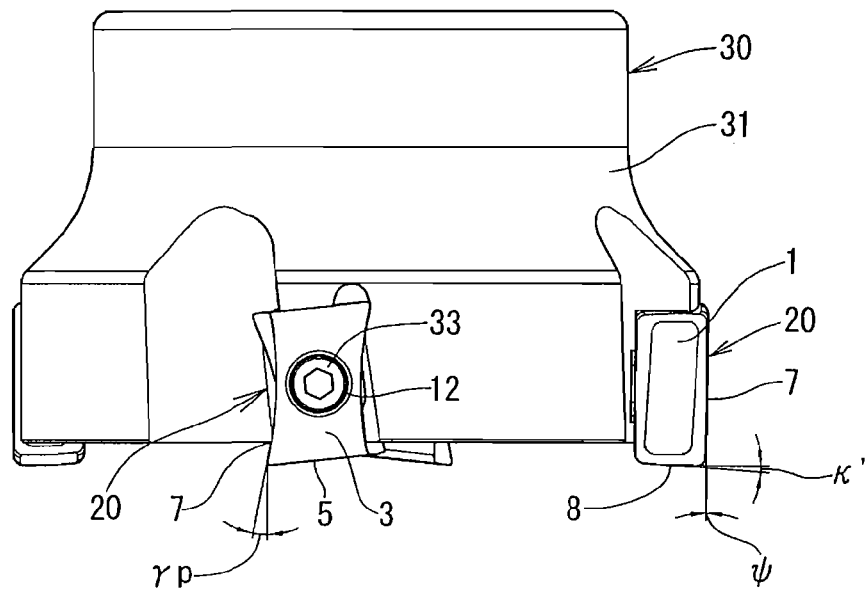
FIG. 7 is a side-view drawing of the cutter from FIG. 6.
Figure 8:
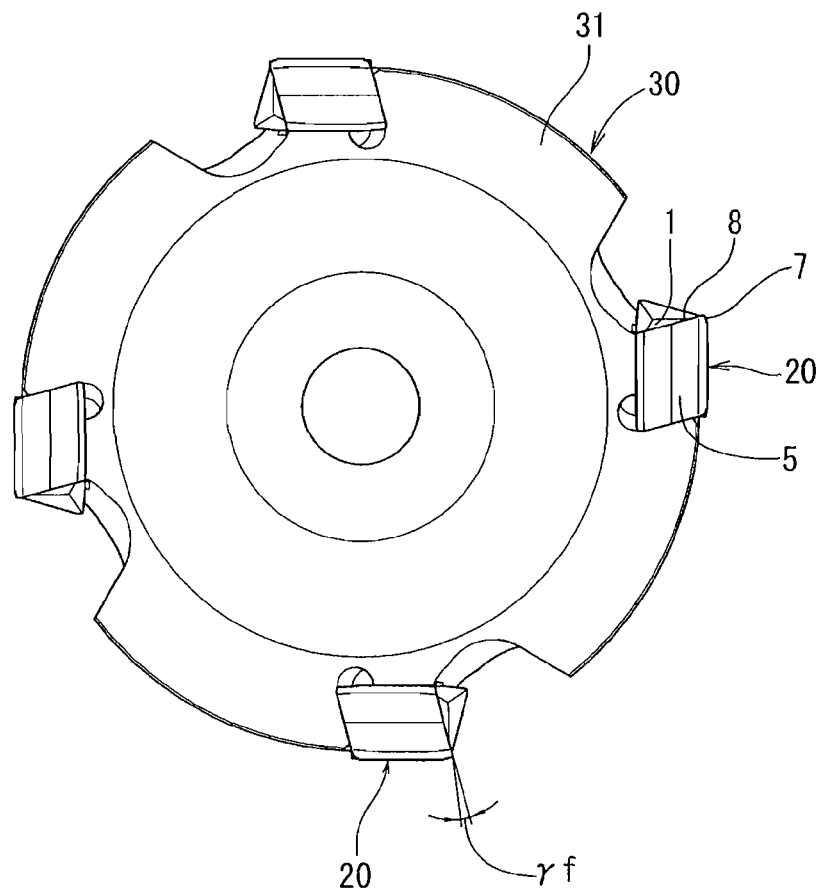
FIG. 8 is a front-view drawing of the cutter from FIG. 6.
Figure 9:
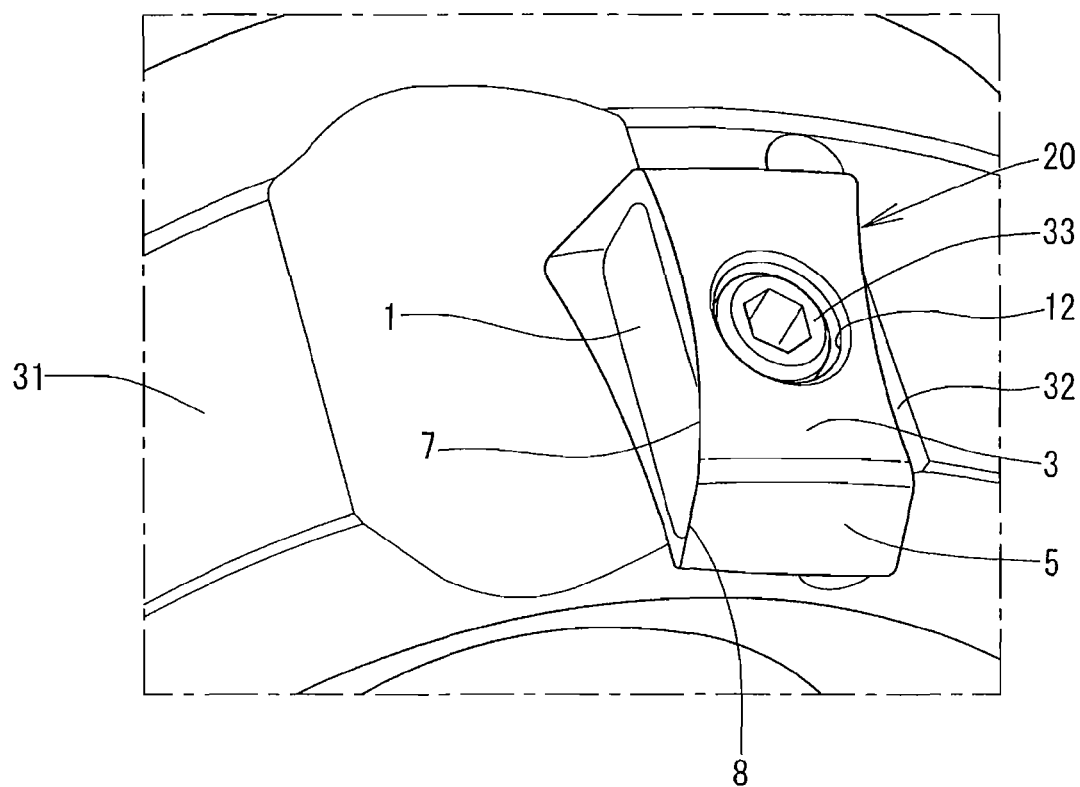
FIG. 9 is a detail perspective drawing of an insert mounting section of the cutter from FIG. 6.
Figure 10:
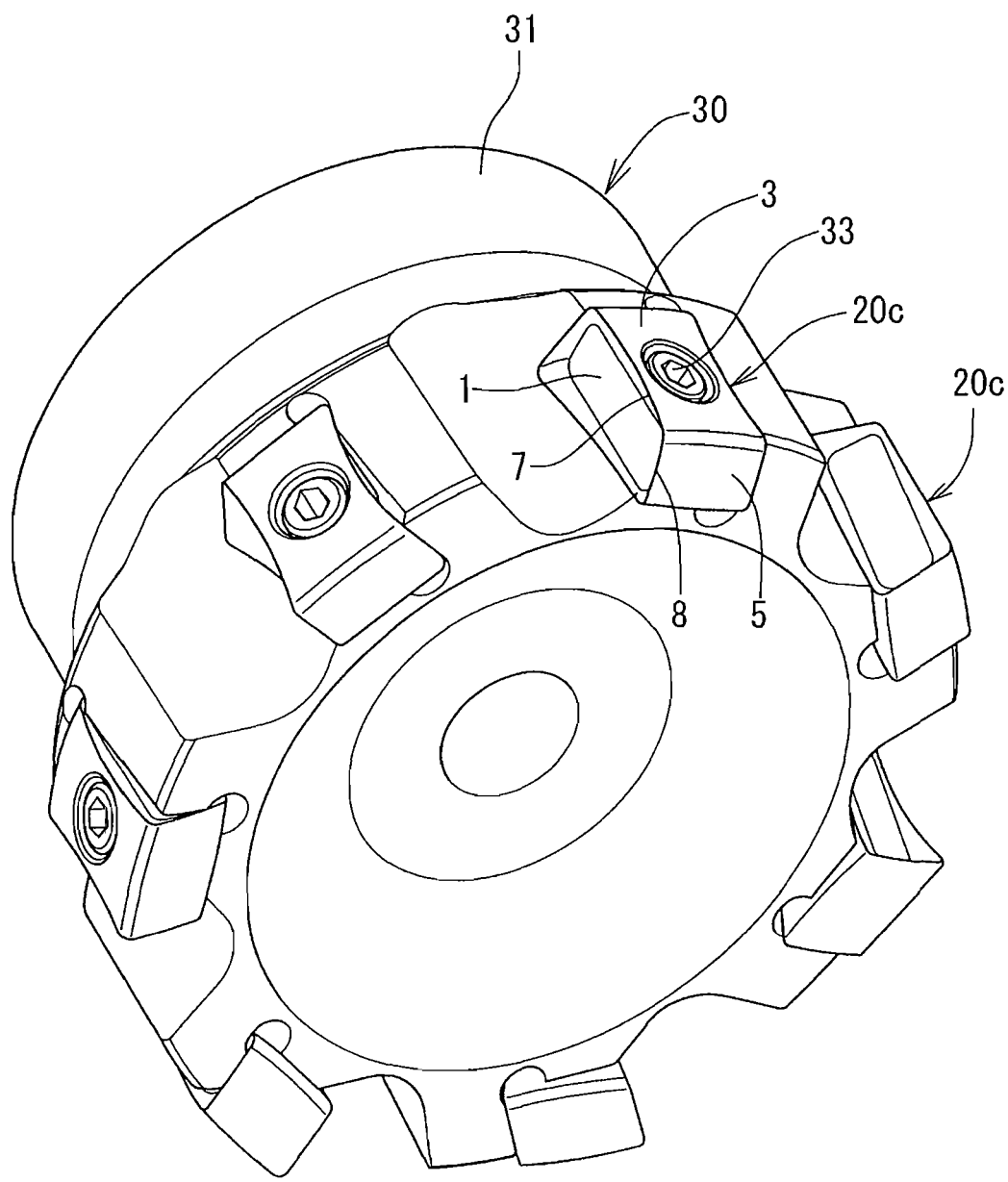
FIG. 10 is a perspective drawing of another example of a corner milling cutter according to the present invention.

FIG. 10 shows the present invention used in a cutter with seven blade. As show here, the corner milling cutter can be set up for any number of blades and is not restricted to the four blades as shown in FIG. 6 through FIG. 8.

What is claimed is:

1. A replaceable-blade cutting insert for corner milling cutters comprising:
   a first surface and a second surface facing opposite directions;
   a third surface and a fourth surface intersecting with and connecting to said first surface and said second surface; and
   a fifth surface and a sixth surface intersecting with said first surface and said second surface and said third surface and said fourth surface,
   wherein said first surface is used as a rake face, said third surface is used as an outer perimeter flank face, and said fifth surface is used as a front flank face,
   wherein four sections of said third surface are twisted towards said fourth surface to form four twisted surfaces that slope towards said fourth surface at substantially 3 to 15 deg, two of said four twisted surfaces of said third surface intersect with said first surface and create with said first surface a ridge line that serves as a main cutting section, and two of said four twisted surfaces of said third surface intersect with said second surface,
   wherein four sections of said fourth surface are twisted towards said third surface to form four twisted surfaces that slope towards said third surface at substantially 3 to 15 degrees, two of said four twisted surfaces of said fourth surface intersect with said first surface, and two of said four twisted surfaces of said fourth surface intersect with said second surface,
   wherein said four twisted surfaces of said third surface and said four twisted surfaces of said fourth surface are each formed with a width that gradually decreases.

2. A replaceable-blade cutting insert according to claim 1 wherein a height offset is formed on said first surface so that a surface position toward a corner is higher.

3. A replaceable-blade cutting insert according to claim 2, further comprising:
   a height offset formed on said first surface so that a first pair of diagonal corners are higher than a second pair of diagonal corners; and, of ridge lines formed between said first surface and said two twisted surfaces of said third surface and between said first surface and said fifth surface, a ridge line toward said first pair of diagonal corners is used as a cutting section.

4. A replaceable-blade cutting insert according to claim 1 wherein a positive land is formed on an outer perimeter section of said first surface.

5. A replaceable-blade cutting insert according to claim 1 wherein a section of said third surface excluding said four twisted surfaces includes two flat surfaces, said two flat surfaces intersecting at an obtuse angle to form a hump when said first surface is viewed from a front view.

6. A replaceable-blade cutting insert according to claim 1 wherein an angle of a corner where said fifth surface and said third surface intersect is no more than 95deg.

7. A replaceable-blade cutting insert according to claim 1 wherein, when said insert is rotated 180 deg along a horizontal plane, an outline shape stays identical between said third surface and said fourth surface and between said fifth surface and said sixth surface.

8. A replaceable-blade cutting insert according to claim 7 wherein when said insert is flipped around a bisecting line bisecting a height axis of said first surface, an outline shape stays identical between said first surface and said second surface.

9. A replaceable-blade corner milling cutter wherein said replaceable-blade cutting insert according to claim 1 is mounted on a base disposed at an outer perimeter of an end of a main cutter body so that said first surface serves as a rake face, said third surface including said four twisted surfaces serves as an outer perimeter flank face, said fifth surface serves as a front flank face, said ridge line between said first surface and said two twisted surfaces of said third surface serves as a primary cutting section, and a ridge line between said first surface and said fifth surface serves as a secondary cutting section, and so that an axial rake is positive or negative, a radial rake is negative, and an approach angle is 0 deg.

* * * * *